US012571910B2

(12) United States Patent
Murata

(10) Patent No.: US 12,571,910 B2
(45) Date of Patent: Mar. 10, 2026

(54) RADAR DEVICE

(71) Applicant: Alps Alpine Co., Ltd., Tokyo (JP)

(72) Inventor: Takahiro Murata, Miyagi-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 259 days.

(21) Appl. No.: 18/488,413

(22) Filed: Oct. 17, 2023

(65) Prior Publication Data

US 2024/0046660 A1 Feb. 8, 2024

Related U.S. Application Data

(63) Continuation of application No. PCT/JP2022/011145, filed on Mar. 11, 2022.

(30) Foreign Application Priority Data

Jun. 28, 2021 (JP) ................................. 2021-107061

(51) Int. Cl.
*G01S 13/931* (2020.01)
*G01S 13/89* (2006.01)
*G06V 20/58* (2022.01)

(52) U.S. Cl.
CPC ............ *G01S 13/931* (2013.01); *G01S 13/89* (2013.01); *G06V 20/586* (2022.01); *G01S 2013/9314* (2013.01); *G01S 2013/932* (2020.01)

(58) Field of Classification Search
CPC ..... G06V 20/586; G01S 13/89; G01S 13/931; G01S 2013/9314; G01S 2013/932; G01S 13/08–13/40
See application file for complete search history.

(56) References Cited

U.S. PATENT DOCUMENTS 5,247,303 A * 9/1993 Cornelius ............... G01S 7/417
342/84
11,675,081 B2 6/2023 Niimura
(Continued)

FOREIGN PATENT DOCUMENTS

JP 2005-338004 12/2005
JP 2018-25449 2/2018
(Continued)

OTHER PUBLICATIONS

International Search Report from International Application No. PCT/JP2022/011145 dated Apr. 26, 2022.

*Primary Examiner* — Matthew M Barker

(74) *Attorney, Agent, or Firm* — Beyer Law Group LLP

(57) ABSTRACT

A radar device includes (a) a vehicle speed acquisition unit that acquires the speed of a vehicle, (b) a transmission unit that transmits a transmission signal toward an area including a direction orthogonal to the travel direction of the vehicle, (c) a reception unit that receives a reflected signal of the transmission signal transmitted by the transmission unit, (d) a pseudo signal creation unit that creates as many pseudo reception signals as are appropriate to the speed of the vehicle, the speed having been acquired by the vehicle speed acquisition unit, according to the reflected signal received by the reception unit, and (e) a distance detection unit that detects the distance to an object present in the direction orthogonal to the travel direction of the vehicle, according to the reflected signal received by the reception unit and the pseudo reception signals created by the pseudo signal creation unit.

7 Claims, 11 Drawing Sheets

(56)  References Cited

U.S. PATENT DOCUMENTS

| | | | |
|---|---|---|---|
| 2017/0219689 A1* | 8/2017 | Hung | .................... G01S 7/0232 |
| 2021/0018594 A1 | 1/2021 | Kipp | |
| 2022/0057511 A1* | 2/2022 | Zhu | ......................... G01S 17/89 |
| 2022/0208005 A1 | 6/2022 | Sahara et al. | |

FOREIGN PATENT DOCUMENTS

| | | |
|---|---|---|
| JP | 2019-23595 | 2/2019 |
| WO | 2020/241235 | 12/2020 |

* cited by examiner

FIG. 3

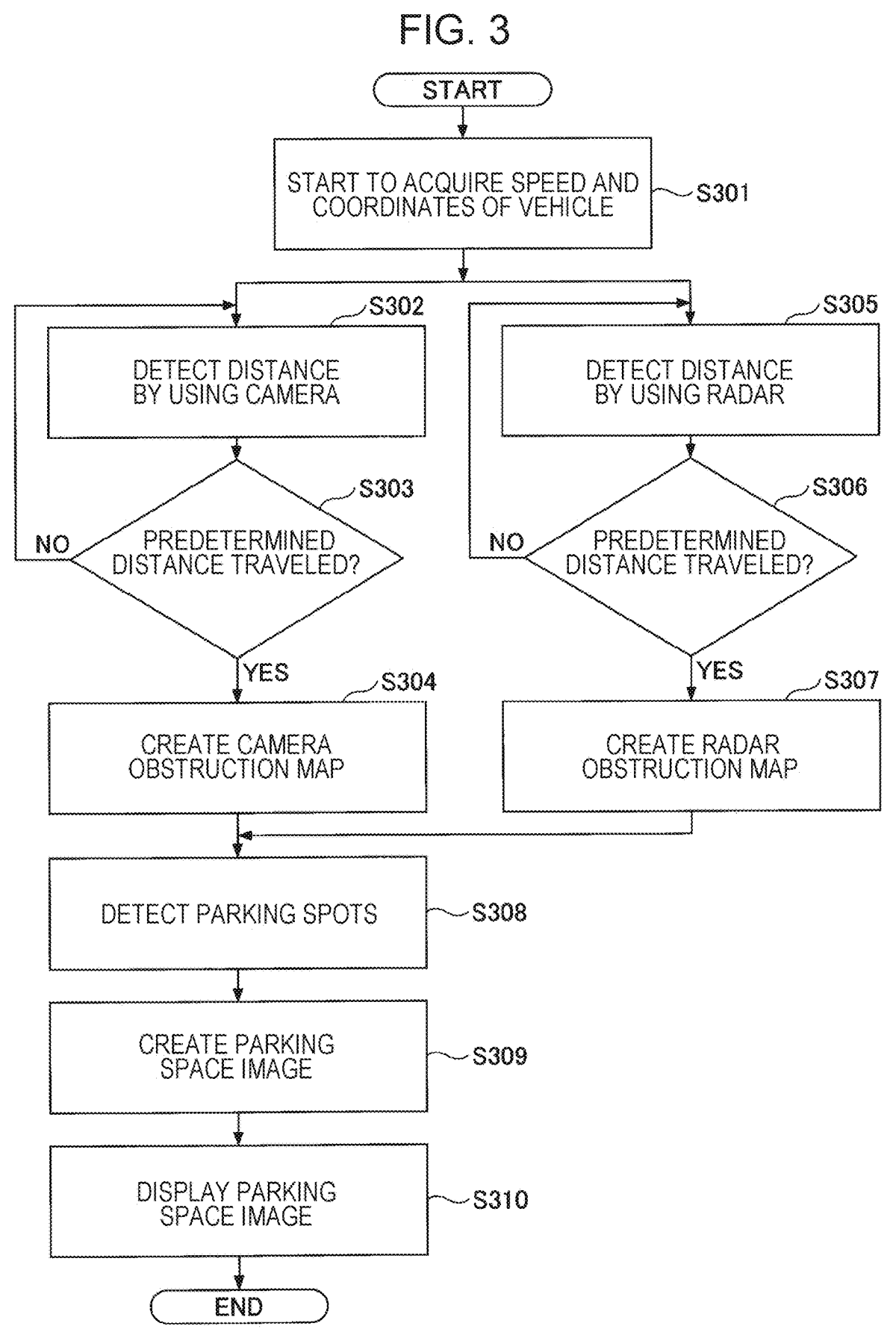

START

START TO ACQUIRE SPEED AND COORDINATES OF VEHICLE — S301

DETECT DISTANCE BY USING CAMERA — S302

PREDETERMINED DISTANCE TRAVELED? — S303
NO

YES — S304
CREATE CAMERA OBSTRUCTION MAP

DETECT DISTANCE BY USING RADAR — S305

PREDETERMINED DISTANCE TRAVELED? — S306
NO

YES — S307
CREATE RADAR OBSTRUCTION MAP

DETECT PARKING SPOTS — S308

CREATE PARKING SPACE IMAGE — S309

DISPLAY PARKING SPACE IMAGE — S310

END

LOW VEHICLE SPEED

MEDIUM VEHICLE SPEED

HIGH VEHICLE SPEED

RADAR DEVICE

CLAIM OF PRIORITY

This application is a Continuation of International Application No. PCT/JP2022/011145 filed on Mar. 11, 2022, which claims benefit of Japanese Patent Application No. 2021-107061 filed on Jun. 28, 2021. The entire contents of each application noted above are hereby incorporated by reference.

BACKGROUND OF THE INVENTION

1. Field of the Invention

The present invention relates to a radar device.

2. Description of the Related Art

The technology disclosed in Japanese Unexamined Patent Application Publication No. 2018-25449 is involved in a radar device that illuminates a search range and receives light reflected from an object in the search range to detect the distance to the object. In this technology, the number of light receptions and the number of light emissions are reduced to reduce power consumption while the vehicle on which the radar device is mounted is working as specified.

With the technology described in Japanese Unexamined Patent Application Publication No. 2018-25449, however, there is the fear that since the number of light receptions and the number of light emissions are reduced, precision with which the distance to the object is detected is lowered.

SUMMARY OF THE INVENTION

A radar device in an embodiment has: a vehicle speed acquisition unit that acquires the speed of a vehicle; a transmission unit that transmits a transmission signal toward an area including a direction orthogonal to the travel direction of the vehicle; a reception unit that receives a reflected signal of the transmission signal transmitted by the transmission unit: a pseudo signal creation unit that creates as many pseudo reception signals as are appropriate to the speed of the vehicle, the speed having been acquired by the vehicle speed acquisition unit, according to the reflected signal received by the reception unit; and a distance detection unit that detects the distance to an object present in the direction orthogonal to the travel direction of the vehicle, according to the reflected signal received by the reception unit and to the pseudo reception signals created by the pseudo signal creation unit.

It is possible to provide a radar device in an embodiment that can highly precisely detect the distance to an object in the vicinity of a vehicle and can suppress electric power consumed in transmission and reception of signals.

BRIEF DESCRIPTION OF THE DRAWINGS

FIG. 3 is a flowchart illustrating an example of a procedure for processing by the radar device in the embodiment;

FIG. 5 illustrates a relationship between transmission time and frame cycles, which are both used in the calculation of a reference transmission pulse count;

FIG. 6 illustrates a relationship between a reference transmission pulse count and a transmission pulse count in one detection cycle;

DESCRIPTION OF THE PREFERRED EMBODIMENTS

An embodiment of the present invention will be described below with reference to the drawings.

<Structure of Radar Device 100>

Figure 1:
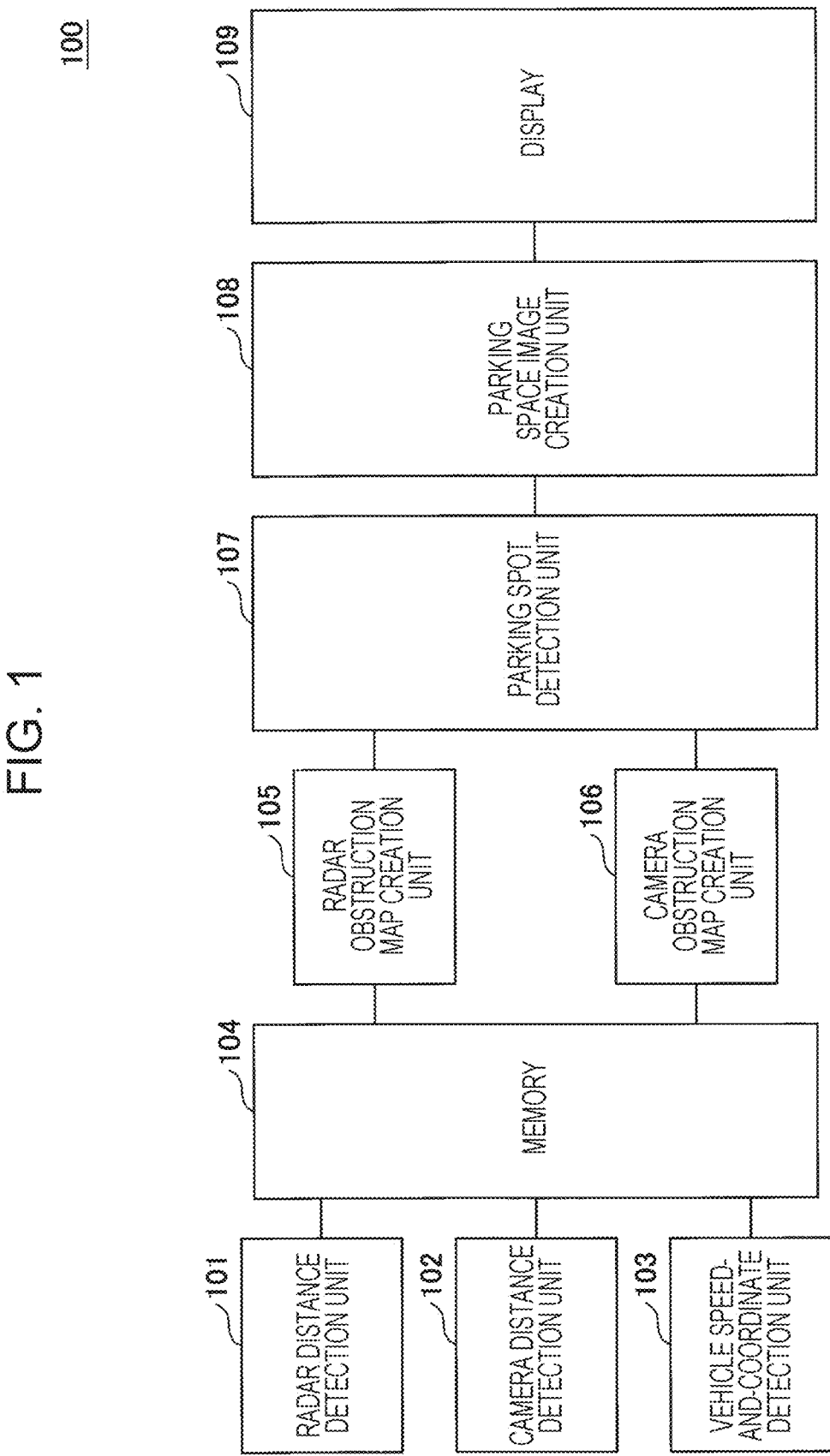
FIG. 1 illustrates the system structure of a radar device in an embodiment.

FIG. 1 illustrates the system structure of a radar device 100 in an embodiment. The radar device 100 has a radar distance detection unit 101, a camera distance detection unit 102, a vehicle speed-and-coordinate detection unit 103, a memory 104, a radar obstruction map creation unit 105, a camera obstruction map creation unit 106, a parking spot detection unit 107, a parking space image creation unit 108, and a display 109, as illustrated in FIG. 1.

The radar distance detection unit 101 uses a radar wave to detect the distance to an object present in a lateral direction of a vehicle (the lateral direction is an example of a direction orthogonal to the travel direction of the vehicle).

The camera distance detection unit 102 uses a camera to capture an image in the lateral direction of the vehicle, performs image recognition processing on the image, and detects the distance to the object present in the lateral direction of the vehicle.

The vehicle speed-and-coordinate detection unit 103 acquires the speed and coordinates of the vehicle. For example, the vehicle speed-and-coordinate detection unit 103 acquires the speed and coordinates of the vehicle from sensors, an electronic control unit (ECU), or the like mounted in the vehicle. That is, the vehicle speed-and-coordinate detection unit 103 has a function as a vehicle speed acquisition unit.

The memory 104 stores the distance, detected by the radar distance detection unit 101, to the object, the distance, detected by the camera distance detection unit 102, to the object, and the speed and coordinates detected by the vehicle speed-and-coordinate detection unit 103.

The radar obstruction map creation unit 105 creates a radar obstruction map from a plurality of distances detected by the radar distance detection unit 101 (distances to objects). A radar obstruction map indicates, in a two-dimensional matrix form, whether an object (obstruction) is present in a peripheral area, detected by the radar distance detection unit 101, around the vehicle.

The camera obstruction map creation unit 106 creates a camera obstruction map from a plurality of distances detected by the camera distance detection unit 102 (distances to objects). A camera obstruction map indicates, in a two-dimensional matrix form, whether an object (obstruction) is present in a peripheral area, detected by the camera distance detection unit 102, around the vehicle.

The parking spot detection unit 107 preferably detects empty parking spots, at which parking is possible, present in the vicinity of the vehicle from the radar obstruction map created by the radar obstruction map creation unit 105 and the camera obstruction map created by the camera obstruction map creation unit 106. For example, in an area in the vicinity of the vehicle, the parking spot detection unit 107 detects an empty parking spot at which an object (obstruction) in a rectangular frame shape is not preset, the empty parking spot having a size large enough for the vehicle to park, from the radar obstruction map and the camera obstruction map, as an empty parking spot, at which parking is possible.

The parking space image creation unit 108 preferably creates a parking space image according to the empty parking spots detected by the parking spot detection unit 107. For example, in the creation of a parking space image, the parking space image creation unit 108 creates a two-dimensional image representing a peripheral area around the vehicle and then highlights each empty parking spot by a predetermined highlighting method (for example, by displaying a rectangular frame) in the two-dimensional image.

The display 109 displays the parking space image created by the parking space image creation unit 108.

<Structure of Radar Distance Detection Unit 101>

Figure 2:
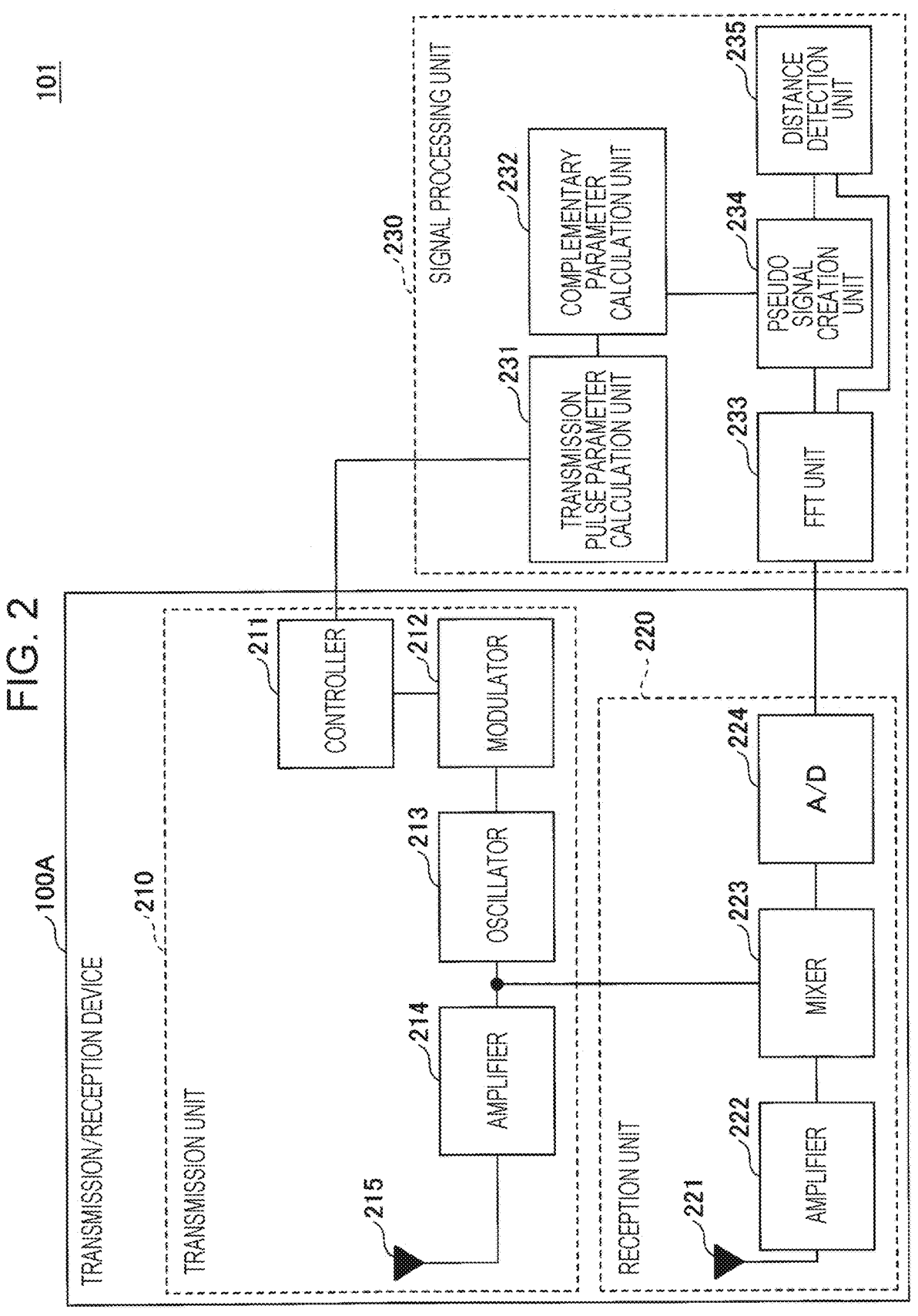
FIG. 2 illustrates the structure of a radar distance detection unit included in the radar device in the embodiment.

FIG. 2 illustrates the structure of the radar distance detection unit 101 included in the radar device 100 in the embodiment. The radar distance detection unit 101 has a transmission unit (transmitter) 210, a reception unit (receiver) 220, and a signal processing unit 230, as illustrated in FIG. 2.

The transmission unit 210 transmits a transmission signal (radar wave) toward the lateral direction of the vehicle. In particular, the transmission unit 210 transmits one transmission signal including M transmission pulses in each detection cycle. Here, M is a transmission pulse count calculated by a parameter calculation unit 231 (that is, M is preferably a transmission pulse count smaller than a reference transmission pulse count N that satisfies predetermined distance detection precision).

Specifically, the transmission unit 210 has a controller 211, a modulator 212, an oscillator 213, an amplifier 214, and a transmission antenna 215. The controller 211 creates a transmission code. The modulator 212 creates a modulated signal by performing frequency modulation on the transmission code created by the controller 211. The oscillator 213 creates a transmission signal (for example, a radar wave such as a frequency modulated continuous wave (FMCW)) having an oscillation frequency matching the modulated signal created by the modulator 212. The amplifier 214 amplifies the signal level of the transmission signal created by the oscillator 213. The transmission antenna 215 emits the signal amplified by the amplifier 214 to the space.

Each time the transmission unit 210 transmits a transmission signal, the reception unit 220 receives the reflected signal of the transmission signal transmitted by the transmission unit 210. That is, when a transmission signal including M transmission pulses is transmitted by the transmission unit 210, the reception unit 220 receives a reflected signal including M reception pulses.

Specifically, the reception unit 220 has a reception antenna 221, an amplifier 222, a mixer 223, and an A/D 224. The reception antenna 221 receives a reflected signal from the space. The amplifier 222 amplifies the reflected signal received by the reception antenna 221. The mixer 223 mixes the transmission signal and reflected signal together for synchronous detection and creates an intermediate frequency signal. The A/D 224 is an analog/digital (A/D) converter that converts the intermediate frequency signal created by the mixer 223 from analog to digital. The reception unit 220 outputs the intermediate frequency signal (digital signal) output from the A/D 224 to the signal processing unit 230.

The transmission unit 210 and reception unit 220 are implemented by, for example, a radar transmission/reception device 100A disposed in the vehicle so that the lateral direction of the vehicle matches a direction in which signals are transmitted and received.

The signal processing unit 230 has a transmission pulse parameter calculation unit (pulse number calculator) 231, a complementary parameter calculation unit 232, a fast Fourier transform (FFT) unit 233, a pseudo signal creation unit (pseudo signal generator) 234, and a distance detection unit (distance detector) 235.

The transmission pulse parameter calculation unit 231 calculates the reference transmission pulse count N and transmission pulse count M as transmission pulse parameters. The reference transmission pulse count N is the number of transmission pulses needed to satisfy the predetermined distance detection precision (specifically, the number of transmission pulses in each detection cycle). The transmission pulse parameter calculation unit 231 sets a larger value as the reference transmission pulse count N as the speed, acquired by the vehicle speed-and-coordinate detection unit 103, of the vehicle is lower. This is because the relative speed of the vehicle with respect to an object is lower as the speed of the vehicle is lower, so resolution needs to be increased. The transmission pulse count M is the number of transmission pulses that are actually transmitted by the transmission unit 210 (specifically, the number of transmission pulses in each detection cycle).

The complementary parameter calculation unit 232 calculates a pseudo receptions signal count K and a to-be-used pulse count I as complementary parameters. The pseudo receptions signal count K is the number of pseudo reception signals needed to satisfy the predetermined distance detection precision. Specifically, the pseudo receptions signal count K is obtained by subtracting the transmission pulse count M from the reference transmission pulse count N. The to-be-used pulse count I is the number of reception pulses, included in the transmission pulse count M, that are used in the creation of a pseudo reception signal.

The FFT unit 233 performs a Fourier transform on the reflected signal received by the reception unit 220 (specifically, the reflected signal is the intermediate frequency signal output from the reception unit 220) to create distance data (frequency spectrum) indicating the distance to the object. When the transmission unit 210 successively transmits a transmission signal including M transmission pulses a plurality of times and the reception unit 220 successively receives a reflected signal including M reception pulses a plurality of times, the FFT unit 233 successively creates a plurality of pieces of data.

The pseudo signal creation unit 234 creates the same number of pseudo reception signals as the pseudo receptions signal count K calculated by the complementary parameter calculation unit 232 (that is, the count appropriate to the speed, acquired by the vehicle speed-and-coordinate detection unit 103, of the vehicle), according to the reflected signal, including a plurality of reception pulses, received by the reception unit 220.

In particular, the pseudo signal creation unit 234 preferably creates K pseudo reception signals in each detection cycle, K being the difference between the transmission pulse count M of the transmission signal transmitted by the transmission unit 210 and the reference transmission pulse count N appropriate to the speed, acquired by the vehicle speed-and-coordinate detection unit 103, of the vehicle.

Alternatively, the pseudo signal creation unit 234 preferably creates K pseudo reception signals through statistical calculation, according to the reflected signal, including M reception pulses, received by the reception unit 220.

The distance detection unit 235 detects the distance to an object present in the lateral direction of the vehicle, according to the reflected signal, including M reception pulses, received by the reception unit 220 and to K pseudo reception signals created by the pseudo signal creation unit 234. Specifically, the distance detection unit 235 performs coherent integration on the M reception pulses and K pseudo reception signals to detect the distance to the object present in the lateral direction of the vehicle.

<Example of Process Steps Performed by Radar Device 100>

FIG. 3 is a flowchart illustrating an example of a procedure for processing by the radar device 100 in the embodiment.

First, the vehicle speed-and-coordinate detection unit 103 starts to acquire the speed and coordinates of the vehicle (step S301). For example, the vehicle speed-and-coordinate detection unit 103 uses a vehicle speed sensor, a position sensor, and the like to acquire the speed and coordinates of the vehicle in each predetermined sampling cycle (at intervals of, for example, one second, 0.5 second, or the like). Next, the radar device 100 concurrently executes steps S302 to S304 and steps S305 to S307.

<Steps S302 to S304>

In step S302, the camera distance detection unit 102 uses a camera to detect the distance to an object present in the lateral direction of the vehicle. For example, the camera distance detection unit 102 uses a camera disposed on the vehicle so as to be oriented in the lateral direction of the vehicle to detect the distance to an object present in the lateral direction of the vehicle in each predetermined sampling cycle (at intervals of, for example, one second, 0.5 second, or the like).

Next, the radar device 100 decides whether the vehicle has traveled by a predetermined distance, according to the coordinates acquired by the vehicle speed-and-coordinate detection unit 103 (step S303).

If the radar device 100 decides in step S303 that the vehicle has not traveled by the predetermined distance (No in step S303), the radar device 100 executes step S302 again.

If the radar device 100 decides in step S303 that the vehicle has traveled by the predetermined distance (Yes in step S303), the camera obstruction map creation unit 106 creates a camera obstruction map according to a plurality of distances detected by the camera distance detection unit 102 (step S304).

<Steps S305 to S307>

In step S305, the radar distance detection unit 101 uses a radar wave to detect the distance to an object present in the lateral direction of the vehicle. For example, the radar distance detection unit 101 uses the transmission/reception device 100A (that is, the transmission unit 210 and reception unit 220) disposed on the vehicle so as to be oriented in the lateral direction of the vehicle to detect the distance to an object present in the lateral direction of the vehicle in each predetermined sampling cycle (at intervals of, for example, one second, 0.5 second, or the like).

Next, the radar device 100 decides whether the vehicle has traveled by the predetermined distance, according to the coordinates acquired by the vehicle speed-and-coordinate detection unit 103 (step S306).

If the radar device 100 decides in step S306 that the vehicle has not traveled by the predetermined distance (No in step S306), the radar device 100 executes step S305 again.

If the radar device 100 decides in step S306 that the vehicle has traveled by the predetermined distance (Yes in step S306), the radar obstruction map creation unit 105 creates a radar obstruction map according to a plurality of distances detected by the radar distance detection unit 101 (step S307).

<Step S308 and After>

When a camera obstruction map is created in step S304 and a radar obstruction map is also created in step S307, the parking spot detection unit 107 detects empty parking spots present in the vicinity of the vehicle according to the radar obstruction map and camera obstruction map (step S308).

Next, the parking space image creation unit 108 creates a parking space image according to the empty parking spots detected in step S308 (step S309).

Then, the display 109 displays the parking space image created in step S309 (step S310), after which the radar device 100 terminates a series of processing in FIG. 3.

<Example of Distance Detection Process by Radar Distance Detection Unit 101>

Figure 4:
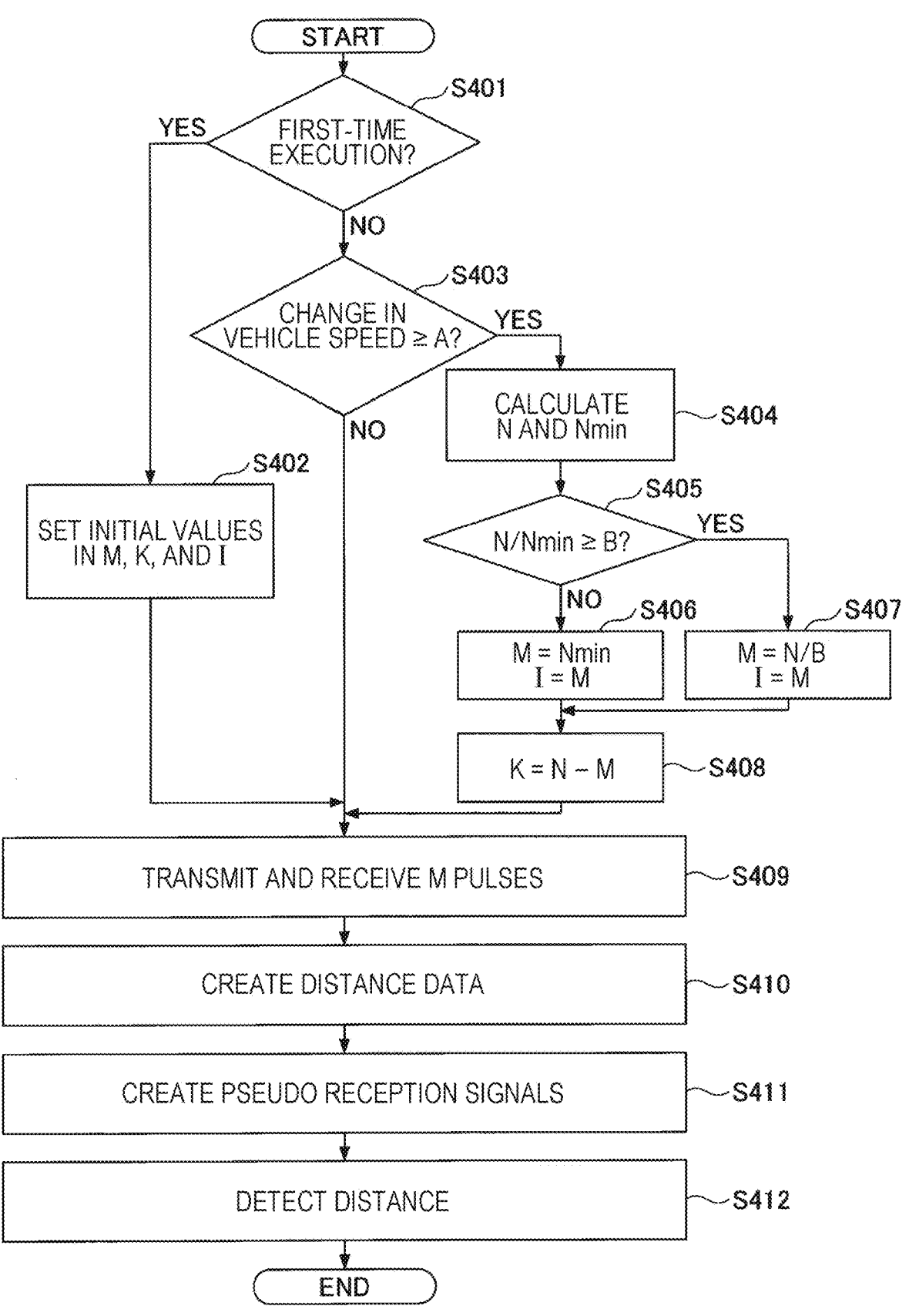
FIG. 4 is a flowchart illustrating an example of a procedure for distance detection processing by the radar distance detection unit included in the radar device in the embodiment.

FIG. 4 is a flowchart illustrating an example of a procedure for distance detection processing by the radar distance detection unit 101 included in the radar device 100 in the embodiment. In FIG. 4, a procedure for distance detection processing by the radar distance detection unit 101 in step S305 in FIG. 3 is illustrated in detail.

First, the radar distance detection unit 101 decides whether the procedure will be executed for the first time (step S401).

If the radar distance detection unit 101 decides in step S401 that the procedure will be executed for the first time (Yes in step S401), the radar distance detection unit 101 sets the transmission pulse count M, pseudo receptions signal count K, and to-be-used pulse count I to their predetermined initial values (step S402). The radar distance detection unit 101 then causes the process to proceed to step S409.

If the radar distance detection unit 101 decides in step S401 that the execution of the procedure is not a first one (No in step S401), the radar distance detection unit 101 decides whether a change in the speed of the vehicle is higher than or equal to a predetermined threshold A (step S403).

If the radar distance detection unit 101 decides in step S403 that the change in the speed of the vehicle is not higher than or equal to the predetermined threshold A (No in step S403), the radar distance detection unit 101 causes the process to proceed to step S409.

If the radar distance detection unit 101 decides in step S403 that the change in the speed of the vehicle is higher than or equal to the predetermined threshold A (Yes in step S403), the transmission pulse parameter calculation unit 231 calculates reference transmission pulse counts N and Nmin (step S404).

The radar distance detection unit 101 then decides whether N/Nmin is greater than or equal to a predetermined threshold B (step S405).

If the radar distance detection unit 101 decides in step S405 that N/Nmin is greater than or equal to the predetermined threshold B (Yes in step S405), the transmission pulse parameter calculation unit 231 sets the transmission pulse count M to NB and the complementary parameter calculation unit 232 sets the to-be-used pulse count I to M (step S407). The complementary parameter calculation unit 232 then sets the pseudo receptions signal count K to N–M (step S408), after which the radar distance detection unit 101 causes the process to proceed to step S409.

If the radar distance detection unit 101 decides in step S405 that N/Nmin is not greater than or equal to the predetermined threshold B (No in step S405), the transmission pulse parameter calculation unit 231 sets the transmission pulse count M to Nmin and the complementary parameter calculation unit 232 sets the to-be-used pulse count I to M (step S406). The complementary parameter calculation unit 232 then sets the pseudo receptions signal count K to N–M (step S408), after which the radar distance detection unit 101 causes the process to proceed to step S409.

In step S409, the transmission unit 210 transmits a transmission signal including M transmission pulses toward the lateral direction of the vehicle and the reception unit 220 receives a reflected signal including M reception pulses. Here, M is the transmission pulse count M set in step S402, S406, or S407.

Next, the FFT unit 233 performs a Fourier transform on an intermediate frequency signal created according to the reflected signal, including M reception pulses, received in step S409 to create M pieces of distance data, each of which indicates a distance to an object (step S410).

Next, the pseudo signal creation unit 234 creates K pseudo reception signals from the M reception pulses received in step S409, according to distance data obtained from I reception pulses, the distance data being part of the distance data created in step S410 (step S411). The pseudo reception signal is pseudo distance data obtained from the distance data created from I reception pulses. Here, K is the pseudo reception signal count set in step S402 or S408, and I is the to-be-used pulse count set in step S402, S406, or S407.

Next, the distance detection unit 235 performs coherent integration on the M pieces of distance data created in step S410 and the K pseudo reception signals created in step S411 to detect the distance to an obstacle present in the lateral direction of the vehicle (step S412).

The distance detection unit 235 can preferably detect, through a coherent integration, the intensity of a spectrum at a frequency of zero, the spectrum being included in a result obtained in an FFT, as the distance to the object at a relative speed of zero with respect to the vehicle. Then, the radar distance detection unit 101 terminates a series of processing in FIG. 4.

<Example of Calculating Reference Transmission Pulse Count N>

Figure 5:
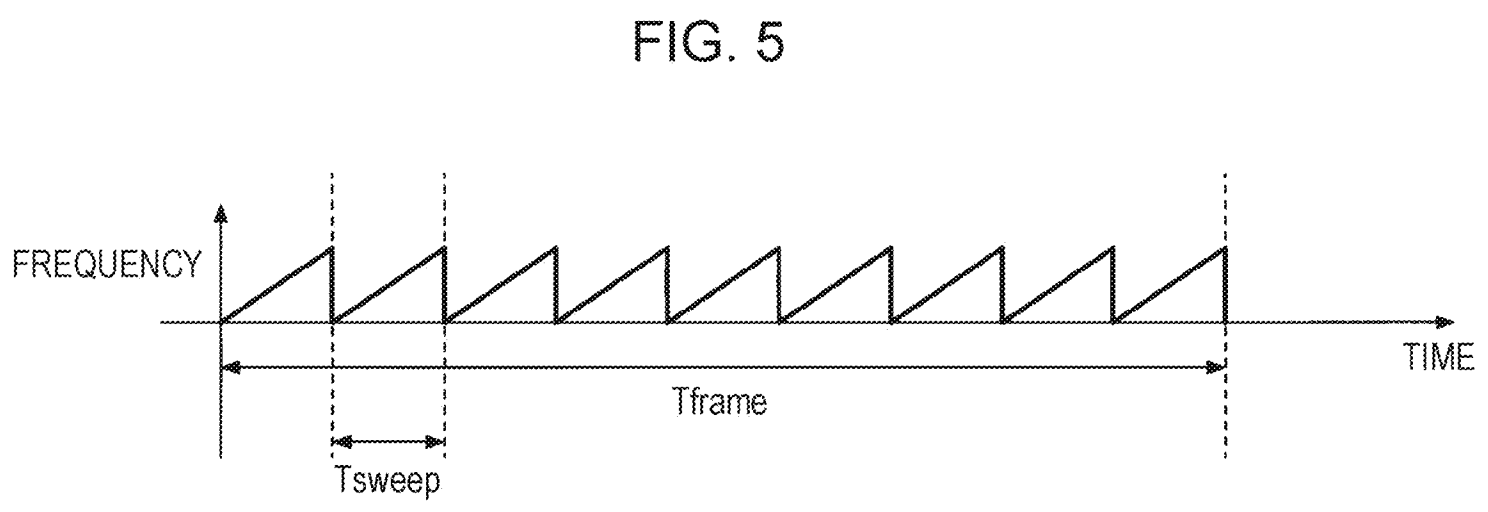

An example of the calculation of the reference transmission pulse count N by the transmission pulse parameter calculation unit 231 will be described with reference to FIG. 5. FIG. 5 illustrates a relationship between transmission time Tsweep and frame cycles Tframe, which are both used in the calculation of the reference transmission pulse count N.

First, the transmission pulse parameter calculation unit 231 calculates transmission time Tsweep per pulse according to equation (1) below, in which Vmax is the maximum vehicle speed used in the detection of empty parking spots, and $\lambda$ is the wavelength of a radar wave transmitted from the transmission unit 210 in the radar distance detection unit 101:

$$T\text{sweep}=4(V\,\text{max}\times\lambda) \tag{1}$$

Next, the transmission pulse parameter calculation unit 231 calculates the frame cycle Tframe that satisfies distance precision from a current vehicle speed V, according to equation (2) below, in which Xacc is distance precision in the X-axis direction (direction corresponding to the right-and-left direction of the vehicle):

$$T\text{frame}=X\text{acc}/V \tag{2}$$

The transmission pulse parameter calculation unit 231 then calculates the reference transmission pulse count N according to equation (3) below:

$$N=T\text{frame}/T\text{sweep} \tag{3}$$

The distance precision Xacc, which is a design item, is set to, for example, 10 cm (however, this is not a limitation). The maximum vehicle speed Vmax, which is also a design item, is set to, for example, 30 km/h (however, this is not a limitation).

<Example of Calculating Pseudo Receptions Signal Count K and to-be-Used Pulse Count I>

Figure 6:
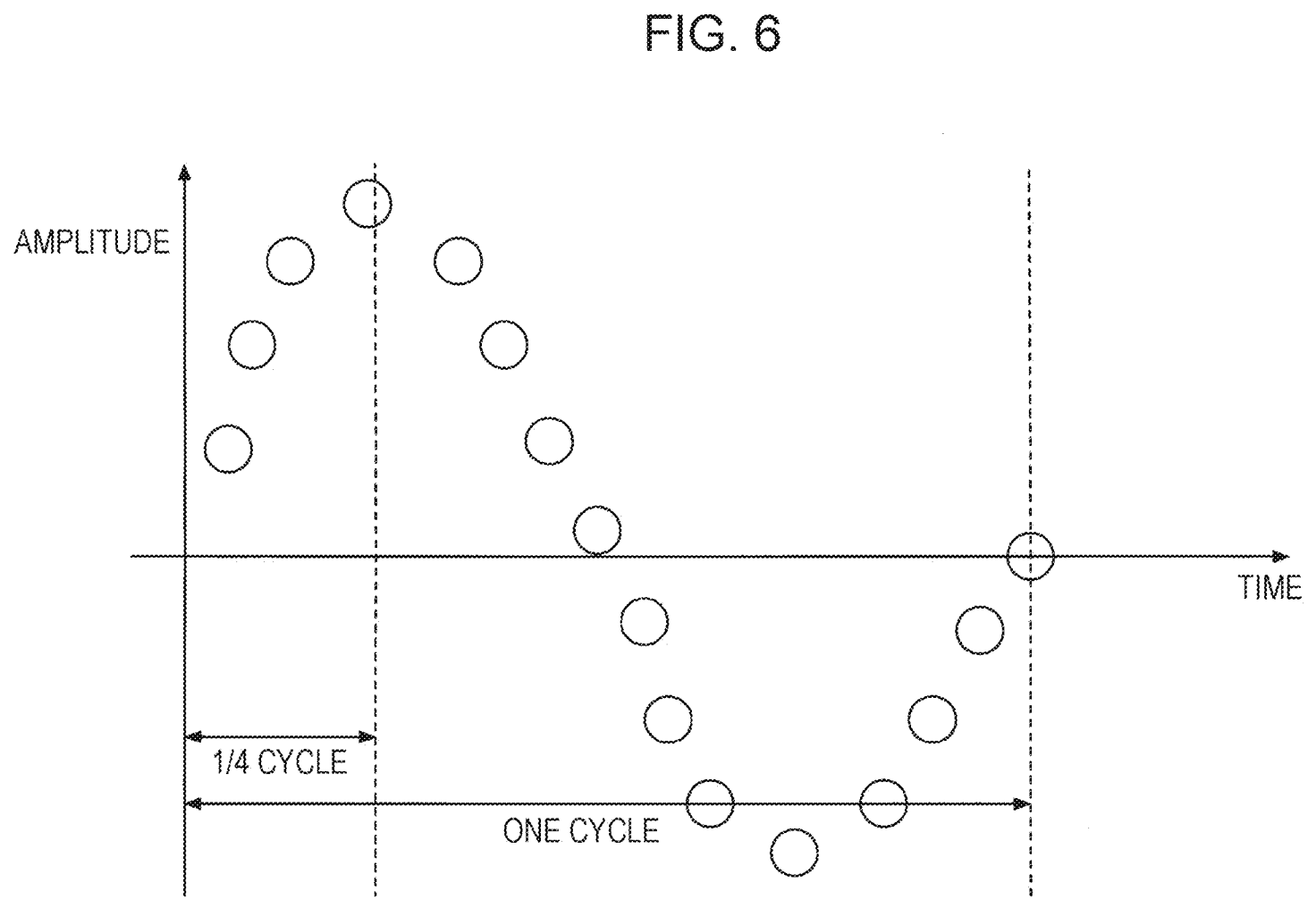

An example of the calculation of the pseudo receptions signal count K and to-be-used pulse count I by the complementary parameter calculation unit 232 will be described with reference to FIG. 6. FIG. 6 illustrates a relationship between the reference transmission pulse count N and transmission pulse count M in one detection cycle.

The transmission pulse parameter calculation unit 231 calculates the reference transmission pulse count Nmin needed when the vehicle speed is the maximum vehicle speed Vmax as well as the reference transmission pulse count N needed when the vehicle speed is the current vehicle speed V in advance, according the calculation method described with refence to FIG. 5. When the current vehicle speed V exceeds the maximum vehicle speed Vmax, the transmission pulse parameter calculation unit 231 calculates the reference transmission pulse count N on the assumption that the current vehicle speed V is equal to the maximum vehicle speed Vmax.

When (reference transmission pulse count N/reference transmission pulse count Nmin) is smaller than or equal to a threshold B (which is, for example, 4), that is, when the vehicle speed is relatively high, the transmission pulse parameter calculation unit 231 sets the transmission pulse count M to the reference transmission pulse count Nmin. The complementary parameter calculation unit 232 sets the to-be-used pulse count I to the transmission pulse count M.

When (reference transmission pulse count N/reference transmission pulse count Nmin) is greater than the threshold B (which is, for example, 4), that is, when the vehicle speed is relatively low, the transmission pulse parameter calculation unit 231 sets the transmission pulse count M to (reference transmission pulse count N/threshold B). The complementary parameter calculation unit 232 sets the to-be-used pulse count I to the transmission pulse count M.

Then, the complementary parameter calculation unit 232 calculates the pseudo receptions signal count K according to equation (4) below:

$$K=N-M \tag{4}$$

For example, FIG. 6 illustrates an example in which when the vehicle speed is maximized, the reference transmission pulse count Nmin needed in one detection cycle is set to 16. In this case, to reproduce a waveform for one detection cycle, it is at least necessary for the transmission pulse count M to be set to 4 or more (¼ cycle or more). On the basis of this concept, the threshold B is preferably set to 4. When the vehicle speed is lower than the maximum vehicle speed, the reference transmission pulse count N needed for one detection cycle becomes greater. In this case, when the transmission pulse count M is increased according to (M=reference transmission pulse count N/threshold B), the transmission pulse count M can be set to 4 or more (¼ cycle or more).

<Examples of Signals to be Transmitted and Received>

Figure 7A:
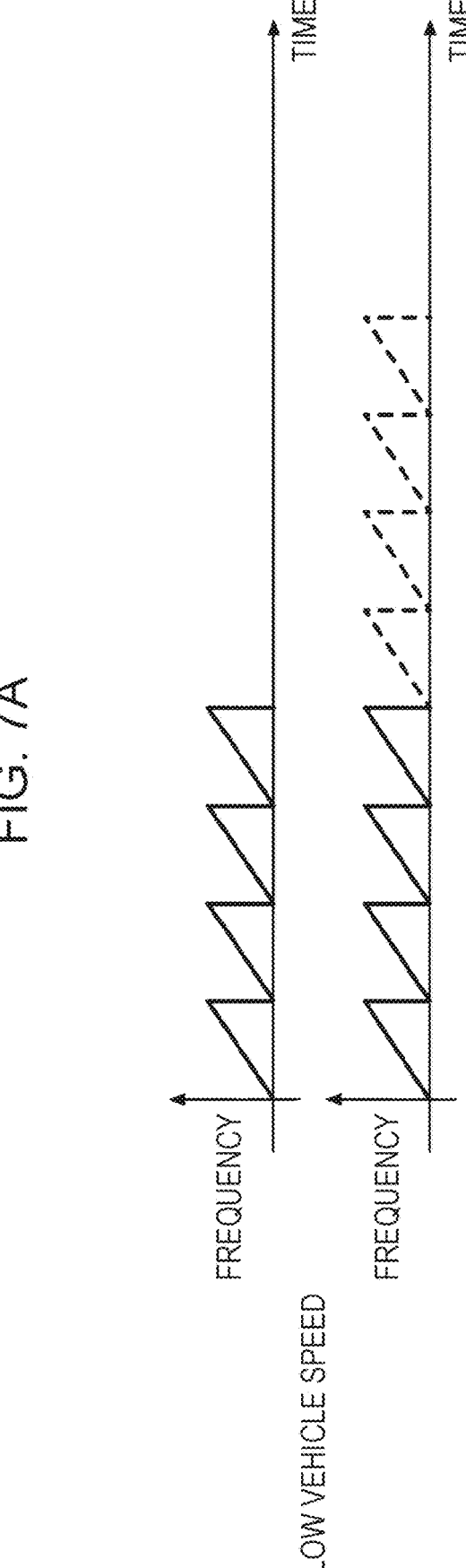
FIG. 7A illustrates examples of signals transmitted and received by the radar device in the embodiment.
Figure 7B:
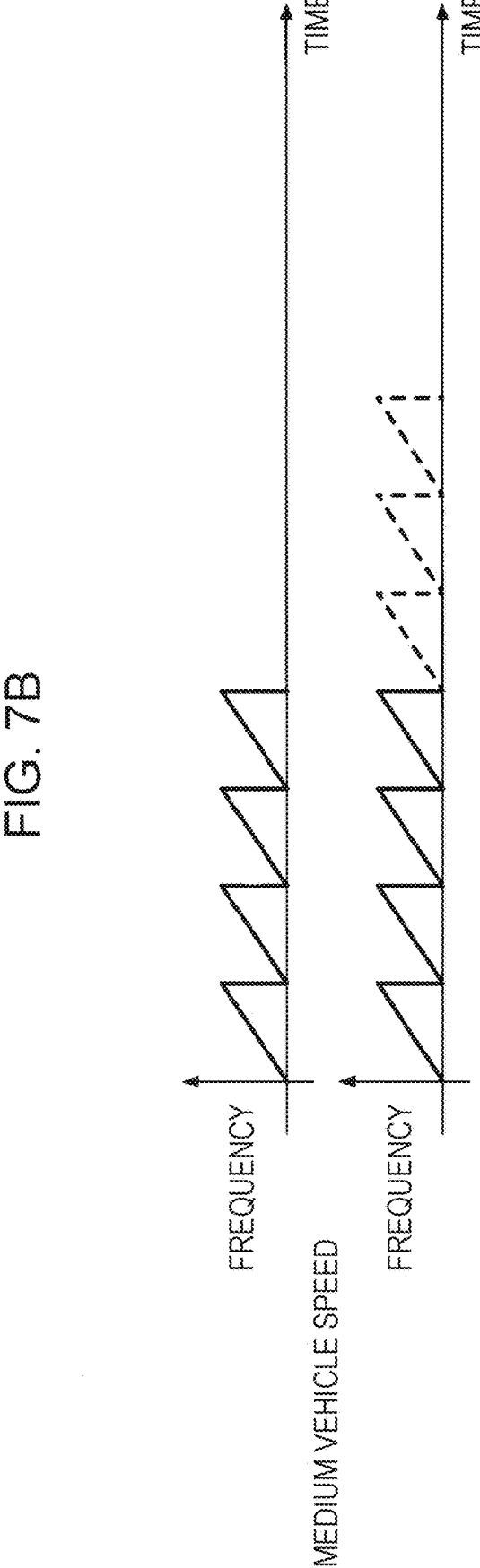
FIG. 7B illustrates other examples of signals transmitted and received by the radar device in the embodiment.
Figure 7C:
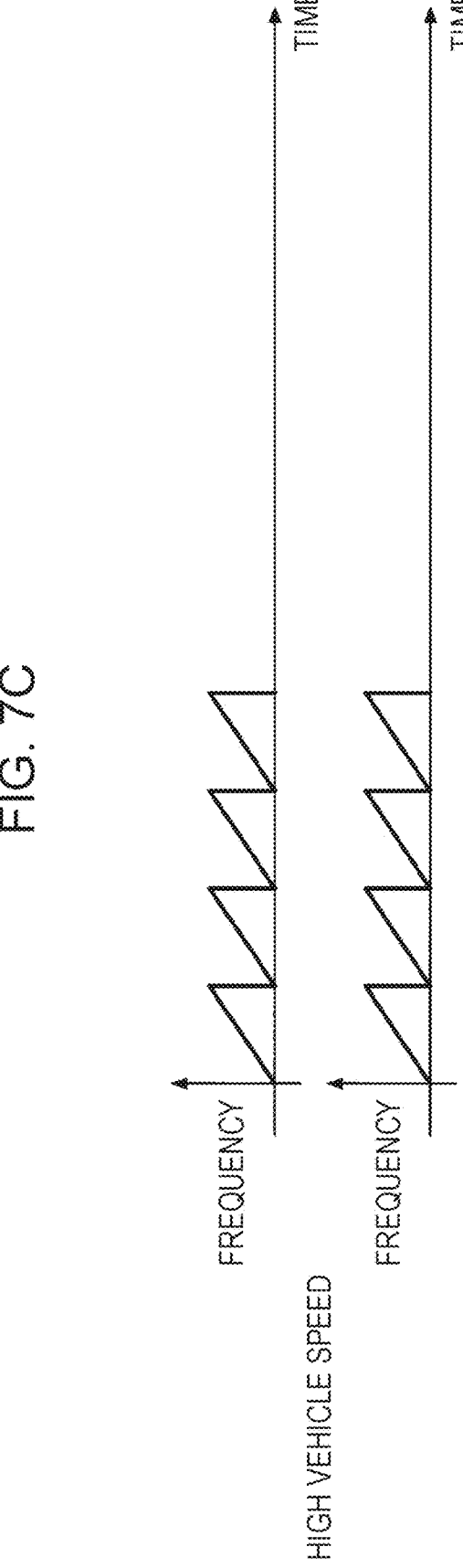
FIG. 7C illustrates yet other examples of signals transmitted and received by the radar device in the embodiment.

FIGS. 7A to 7C illustrate examples of signals transmitted and received by the radar device 100. In FIGS. 7A to 7C, the upper solid line indicates the waveform of a transmission signal including a plurality of transmission pulses; the lower solid line indicates the waveform of a reception signal including a plurality of reception pulses; and the dotted line at the bottom indicates the waveform of a pseudo reception signal.

In FIGS. 7A to 7C, the radar device 100 in the embodiment causes the transmission unit 210 to transmit a transmission signal, resulting from frequency modulation, which includes a plurality of transmission pulses. Then, the radar device 100 in the embodiment causes the reception unit 220 to receive a reflected signal including the same number of reception pulses as the number of transmission pulses. In the examples in FIGS. 7A to 7C, the transmission pulse count and reception pulse count are both 4, regardless of the vehicle speed.

In the examples in FIGS. 7A to 7C, however, the pseudo receptions signal count K is varied according to a change in the number of pulses needed to satisfy the predetermined distance detection precision (that is, the reference transmission pulse count N), the change being caused when the vehicle speed changes. Specifically, the lower the vehicle speed is, the more the number of pulses needed to satisfy the predetermined distance detection precision (that is, the reference transmission pulse count N) preferably increases. In response to this, the pseudo receptions signal count K is increased. Thus, the radar device 100 in the embodiment can increase the number of pulses in a reception signal in a pseudo manner while suppressing power consumption by reducing the number of pulses in a transmission signal that is actually transmitted. Therefore, the radar device 100 can highly precisely detect the distance to an object.

<Example of Creating Pseudo Reception Signal>

The pseudo signal creation unit 234 can create, from M reception pulses, X1, X2, . . . , and XM, a pseudo reception signal by calculating a coefficient aN by which predicted error is minimized, by using, for example, a statistical method indicated below and then using the calculated coefficient aN. However, the statistical method indicated below is just an example. The pseudo signal creation unit 234 may use any other statistical method to create a pseudo reception signal.

First, the pseudo signal creation unit 234 calculates a predicted value for the reception pulse X1 by taking a linear combination (weight sum) of the reception pulses X2 to XM according to equation (5) below:

$$\widehat{X_1} = \overline{a_2}^* X_2 + \overline{a_3}^* X_3 + \ldots + \overline{a_M}^* X_M \tag{5}$$

Next, the pseudo signal creation unit 234 calculates the difference between the actually measured value of the reception pulse X1 and its predicted value as backward error, according to equation (6) below:

$$\varepsilon = X_1 - \hat{X}1 \tag{6}$$

Next, the pseudo signal creation unit 234 calculates a predicted value for the reception pulse XM by taking a linear combination (weight sum) of the reception pulses XM−1 to X1 according to equation (7) below:

$$\widehat{X_M} = a_2^* X_{M-1} + a_3^* X_{M-2} + \ldots + a_M^* X_1 \tag{7}$$

Next, the pseudo signal creation unit 234 calculates the difference between the actually measured value of the reception pulse XM and its predicted value as forward error, according to equation (8) below:

$$\rho = X_M - \hat{X}M \tag{8}$$

Next, the pseudo signal creation unit 234 calculates the coefficients a2 to aN by which the sum of the squares of the backward error and forward error is minimized.

Then, the pseudo signal creation unit 234 can calculate a reception pulse XM+1 as a pseudo reception signal according to equation (9) below, in which the calculated coefficients a2 to aN are used:

$$X_{M+1} = a_2^* X_M + a_3^* X_{M-1} + \ldots + a_M^* X_2 \tag{9}$$

<Example of Creating Parking Space Image>

Figure 8:
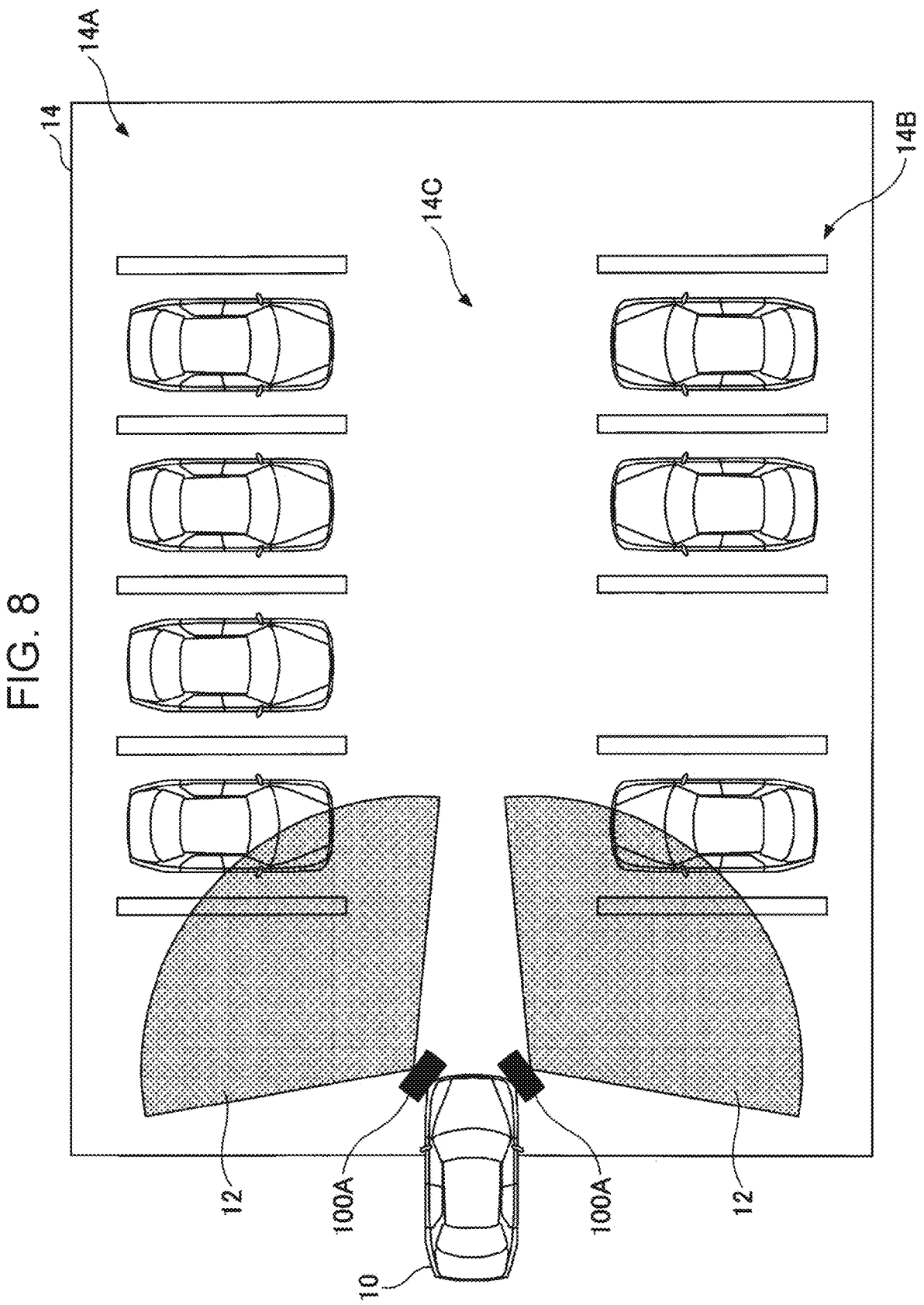
FIG. 8 illustrates an example in which the radar device in the embodiment creates a parking space image.
Figure 9:
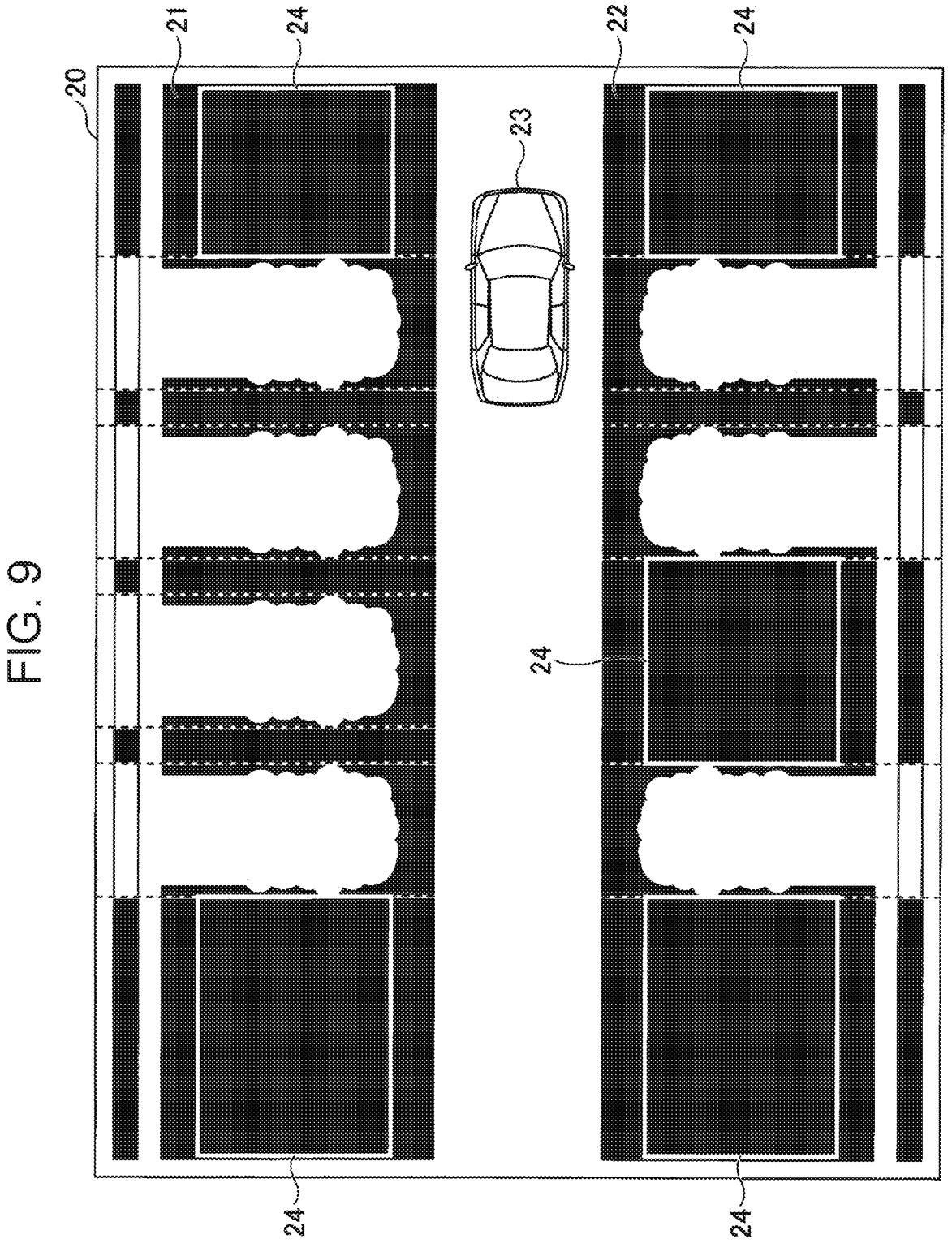
FIG. 9 illustrates an example of a parking space image created by the radar device in the embodiment.

Next, an example of the creation of a parking space image by the radar device 100 in the embodiment will be described with reference to FIGS. 8 and 9. FIG. 8 illustrates an example in which the radar device 100 in the embodiment creates a parking space image. FIG. 9 illustrates an example of a parking space image created by the radar device 100 in the embodiment.

In the example in FIG. 8, a vehicle 10 is going to park in a parking lot 14. As illustrated in FIG. 8, the radar device 100 mounted on the vehicle 10 has radar transmission/reception devices 100A at the front-left corner and front-right-front corner of the vehicle 10, one at each corner. Each transmission/reception device 100A can transmit a radar wave (transmission signal) toward a detection area 12 on the diagonally forward left side or diagonally forward right side of the vehicle 10, whichever is appropriate, and can receive a reflected signal from an object present in the detection area 12.

To create a parking space image, the vehicle 10 passes through a path 14C between a left-side parking space 14A and right-side parking space 14B of the parking lot 14. Thus, the radar device 100 can scan the entire areas of the left-side parking space 14A and right-side parking space 14B by using the radar transmission/reception devices 100A (in the scanning, signals are transmitted and received).

In each predetermined detection cycle, the radar device 100 cam detect the distance to an object present in the left-side parking space 14A on the left side of the vehicle 10 in the forward direction and the distance to an object present in the right-side parking space 14B on the right side of the vehicle 10 in the forward direction, according to the results of scanning by the radar transmission/reception devices 100A. The radar device 100 can then create a parking space image 20 for the parking lot 14 according to these detection results, as illustrated in FIG. 9.

In this case, as described above, the radar device 100 can highly precisely detect the distance to an object while, in each detection cycle, suppressing power consumption by reducing the transmission pulse count M, which indicates the number of actually transmitted transmission pulses, and compensating for a shortage of reception pulses with pseudo reception signals.

The parking space image 20 includes parking space images 21 and 22, a vehicle image 23, and parking possible frame images 24 as illustrated in FIG. 9.

In the parking space image 21, which is a plan image of the left-side parking space 14A, each area in which an object is present is indicated in white and each area in which no object is present is indicated in black.

Similarly, in the parking space image 22, which is a plan image of the right-side parking space 14B, each area in which an object is present is indicated in white and each area in which no object is present is indicated in black.

The vehicle image 23, which is a plan image of the vehicle 10, is indicated at a position, in the parking space image 20, corresponding to the current position of the vehicle 10. That is, in the parking space image 20, the position at which the vehicle 10 is indicated changes as the vehicle 10 travels.

The parking possible frame image 24 is in rectangular frame from, indicating an empty parking spot at which the vehicle 10 can park. Specifically, the parking possible frame image 24 indicates a spot having at least a predetermined size enough to allow the vehicle 10 to park, the spot being in the areas in which no object is present (portions in black) in the parking space images 21 and 22.

The radar device 100 in the embodiment displays the parking space image 20 of this type on the display 109, so the user (the driver of the vehicle 10 or another occupant) can visually find an empty parking spot, in the parking lot 14, at which the vehicle 10 can park.

This completes detailed descriptions of an embodiment of the present invention. However, the present invention is not limited to the embodiment. Various variations and modifications are possible without departing from the intended scope, described in the claims, of the present invention.

This international application claims priority based on Japanese Patent Application No. 2021-107061 filed on Jun. 28, 2021, and the entire contents of the application are incorporated in this international application by reference in it.

What is claimed is:

1. A radar device comprising:
a vehicle speed acquisition section configured to acquire a speed of a vehicle;
a transmitter configured to transmit a transmission signal toward an area including a lateral direction which is a direction orthogonal to a travel direction of the vehicle;
a receiver configured to receive a reflected signal which is the transmission signal reflected by an object;
a pseudo signal generator configured to generate a plurality of pseudo reception signals in accordance with the speed of the vehicle acquired by the vehicle speed acquisition section and the reflected signal received by the receiver; and
a distance detection section configured to detect a distance to an object present in the lateral direction based on the reflected signal received by the receiver and the plurality of pseudo reception signals generated by the pseudo signal generator.

2. The radar device according to claim 1,
wherein the transmission signal has a first number of pulses per detection cycle, the first number being smaller than a reference number which is a transmission pulse number per detection cycle that satisfies predetermined distance detection precision with respect to the speed of the vehicle, and
wherein the pseudo signal generator is configured to generate the plurality of pseudo reception signals such that a number of pseudo reception signals is the same as a difference between the first number and the reference number.

3. The radar device according to claim 2, further comprising:
a pulse number calculator configured to set the reference number such that the smaller the speed of the vehicle acquired by the vehicle speed acquisition section is, the greater the reference number is.

4. The radar device according to claim 1, wherein the distance detection section is further configured to detect a distance to an object having a relative speed of zero with respect to the vehicle.

5. The radar device according to claim 1, wherein the pseudo signal generator is configured to generate the pseudo reception signals by statistical prediction based on the reflected signal received by the receiver.

6. The radar device according to claim 1, further comprising:
a parking space detection section configured to identify an available parking space in a vicinity of the vehicle, based on the distance to the object detected by the distance detection section.

7. The radar device according to claim 6, further comprising:
a parking space image generator configured to generate a parking space plan view, based on at least one available parking space identified by the parking space detection section and distances to a plurality of objects detected by the distance detection section.

* * * * *